United States Patent
Hunleth et al.

(10) Patent No.: US 7,260,789 B2
(45) Date of Patent: Aug. 21, 2007

(54) METHOD OF REAL-TIME INCREMENTAL ZOOMING

(75) Inventors: Frank A. Hunleth, Rockville, MD (US); Daniel S. Simpkins, Bethesda, MD (US)

(73) Assignee: Hillcrest Laboratories, Inc., Rockville, MD (US)

(*) Notice: Subject to any disclaimer, the term of this patent is extended or adjusted under 35 U.S.C. 154(b) by 236 days.

(21) Appl. No.: 11/064,310

(22) Filed: Feb. 23, 2005

(65) Prior Publication Data

US 2005/0188333 A1 Aug. 25, 2005

Related U.S. Application Data

(60) Provisional application No. 60/546,859, filed on Feb. 23, 2004.

(51) Int. Cl.
G06F 3/048 (2006.01)

(52) U.S. Cl. ............ 715/858; 715/856; 715/857; 715/860; 715/764

(58) Field of Classification Search ........ 715/856–858, 715/764, 860
See application file for complete search history.

(56) References Cited

U.S. PATENT DOCUMENTS

| | | | |
|---|---|---|---|
| 4,745,402 A | 5/1988 | Auerbach | |
| 5,045,843 A | 9/1991 | Hansen | |
| 5,341,466 A | 8/1994 | Perlin et al. | |
| 5,359,348 A | 10/1994 | Pilcher et al. | |
| 5,638,523 A | 6/1997 | Mullet et al. | |
| 5,671,342 A | 9/1997 | Millier et al. | |
| 5,745,710 A | 4/1998 | Clanton, III et al. | |
| 5,790,121 A | 8/1998 | Sklar et al. | |
| 5,793,438 A | 8/1998 | Bedard | |
| 5,796,395 A | 8/1998 | de Hond | |
| 5,835,156 A | 11/1998 | Blonstein et al. | |
| 5,912,612 A | 6/1999 | DeVolpi | |
| 5,940,072 A | 8/1999 | Jahanghir et al. | |
| 5,955,988 A | 9/1999 | Blonstein et al. | |
| 5,978,043 A | 11/1999 | Blonstein et al. | |

(Continued)

FOREIGN PATENT DOCUMENTS

GB 2 237 911 A 5/1991
WO WO98/43183 10/1998

OTHER PUBLICATIONS

Quesenbery, W., et al., Designing for Interactive Television, http://www.wqusability.com/articles/itv-design.html, 1996, pp. 1-6.
Prasar, V., Technology to the aid of science popularisation, http://www.vigyanprasar.com/dream/jan99/janvpinsight.htm, Jan. 1999, pp. 1-2.

(Continued)

*Primary Examiner*—Raymond J. Bayerl
*Assistant Examiner*—Sajeda Muhebbullah
(74) *Attorney, Agent, or Firm*—Potomac Patent Group PLLC

(57) ABSTRACT a method for navigating a pointer on a graphical user interface (GUI) includes the steps of: scrolling an input device to locate the pointer corresponding to the input device on a point of interest within the GUI, depressing an actuating button associated with the input device on the point of interest, obtaining a detailed view of the point of interest while centering the point of interest on the GUI and maintaining a position of the pointer on the point of interest.

20 Claims, 3 Drawing Sheets

U.S. PATENT DOCUMENTS

| | | | |
|---|---|---|---|
| 5,982,369 | A | 11/1999 | Sciammarella et al. |
| 6,002,394 | A | 12/1999 | Schein et al. |
| 6,005,578 | A | 12/1999 | Cole |
| 6,016,144 | A | 1/2000 | Blonstein et al. |
| 6,037,933 | A | 3/2000 | Blonstein et al. |
| 6,049,823 | A | 4/2000 | Hwang |
| 6,057,831 | A | 5/2000 | Harms et al. |
| 6,088,031 | A | 7/2000 | Lee et al. |
| 6,092,076 | A | 7/2000 | McDonough et al. |
| 6,154,723 | A | 11/2000 | Cox et al. |
| 6,175,362 | B1 | 1/2001 | Harms et al. |
| 6,181,333 | B1 | 1/2001 | Chaney et al. |
| 6,191,781 | B1 | 2/2001 | Chaney et al. |
| 6,195,089 | B1 | 2/2001 | Chaney et al. |
| 6,268,849 | B1 | 7/2001 | Boyer et al. |
| 6,295,646 | B1 | 9/2001 | Goldschmidt Iki |
| 6,314,575 | B1 | 11/2001 | Billock et al. |
| 6,330,858 | B1 | 12/2001 | McDonough et al. |
| 6,349,257 | B1 | 2/2002 | Liu et al. |
| 6,385,542 | B1 | 5/2002 | Millington |
| 6,397,387 | B1 | 5/2002 | Rosin et al. |
| 6,411,308 | B1 | 6/2002 | Blonstein et al. |
| 6,412,110 | B1 | 6/2002 | Schein et al. |
| 6,415,226 | B1 | 7/2002 | Kozak |
| 6,421,067 | B1* | 7/2002 | Kamen et al. ............ 715/719 |
| 6,426,761 | B1 | 7/2002 | Kanevsky et al. |
| 6,429,813 | B2 | 8/2002 | Fiegen |
| 6,452,609 | B1 | 9/2002 | Katinsky et al. |
| 6,529,218 | B2 | 3/2003 | Ogawa et al. |
| 6,577,350 | B1 | 6/2003 | Proehl et al. |
| 6,621,452 | B2 | 9/2003 | Knockeart et al. |
| 6,735,777 | B1 | 5/2004 | Kim |
| 6,753,849 | B1 | 6/2004 | Curran et al. |
| 6,765,598 | B2 | 7/2004 | Kim |
| 2002/0112237 | A1 | 8/2002 | Kelts |
| 2002/0129366 | A1 | 9/2002 | Schein et al. |
| 2003/0095135 | A1* | 5/2003 | Kaasila et al. ............ 345/613 |
| 2005/0034075 | A1* | 2/2005 | Riegelman et al. ......... 715/714 |
| 2005/0041044 | A1* | 2/2005 | Gannon .................... 345/660 |

OTHER PUBLICATIONS

Press Release, NetTV Selected for 800 Kansas City Classrooms, http://www.fno.org/mar98/NKCSDPR1.html, Mar. 23, 1998, pp. 1-2.

Fuerst, J., et al., Interactive Television: A Survey of the State of Research and the Proposal and Evaluation of a User Interface, http://wwwai.wu-wien.ac.at/~koch/stud/itv/paper.html, Jun. 1996, pp. 1-11.

Bier, E., et al., Toolglass and Magic Lenses: The See-Through Interface, Proceedings of Siggraph 93, Computer Graphics Annual Conference Series, ACM, Aug. 1993, pp. 73-80.

Stone, M., et al., The Movable Filter as a User Interface Tool, Proceedings of CHI '94, ACM, Apr. 24-28, 1994, pp. 306-312.

Bier, E., et al., A Taxonomy of See-Through Tools, Proceedings of CHI '94, ACM, Apr. 24-28, 1994, pp. 358-364.

Fishkin, K., et al., Enhanced Dynamic Queries via Movable Filters, pp. 1-6.

Bederson, B., Quantum Treemaps and Bubblemaps for a Zoomable Image Browser, UIST 2001, ACM Symposium on User Interface Software and Technology, CHI Letters 3(2), pp. 71-80.

International Search Report for PCT/US04/14487.

Written Opinion of the International Searching Authority for PCT/US04/14487.

International Search Report for PCT/US05/05376, mailed Jan. 23, 2007.

Written Opinion for PCT/US05/05376, mailed Jan. 23, 2007.

Verhoeven, A., et al., "Hypermedia on the Map: Spatial Hypermedia in HyperMap," International Conference on Information, Communications and Signal Processing, ICICS '97, Singapore, Sep. 9-12, 1997, pp. 589-592.

International Search Report for PCT/US01/08377, mailed Jul. 25, 2005.

International Search Report for PCT/US01/08331, mailed Nov. 13, 2002.

International Search Report for PCT/US01/08261, mailed Aug. 5, 2002.

* cited by examiner

METHOD OF REAL-TIME INCREMENTAL ZOOMING

RELATED APPLICATIONS

This application claims priority from U.S. Provisional Patent Application No. 60/546,859 filed on Feb. 23, 2004 and entitled "A Method of Real-time Incremental Zooming using Pointing". This application is also related to U.S. patent application Ser. No. 10/768,432. The subject matter of each of these applications are incorporated in its entirety herein by reference.

BACKGROUND

The present invention is directed to user interfaces and more particularly, to a method of navigation and interaction with a user interface. Such interaction and navigation involve operating an input device such as a mouse, a trackball or a three-dimensional (hereinafter "3D") pointing remote device. The operation of the input device includes at least one of point, click, scroll, etc.

User interfaces, such as graphical user interfaces (GUIs) are well known. Virtually all computers include (or, enable) a graphical user interface in order to make the interaction with the computer more "user friendly". This is accomplished by reducing, if not eliminating, the number of keystrokes a user is required to enter in order to perform a function such as launching an application residing on the computer. An increasing number of other electronic devices, from cell phones to user controls on appliances, rely on various graphical user interfaces that facilitate a user interaction with the particular device.

Traditional methods of using a GUI (on a computer for example) include the use of an input device such as a mouse or a track ball. A movement of the mouse or the track ball results in a corresponding pointer moving on the graphical user interface. The pointer can thus be navigated to an object (represented by an icon) on the GUI that corresponds to an executable task such as launching a software application for example. Once the pointer is navigated to an icon, the corresponding task can be executed by clicking (depressing) on an actuating button that is integrated within the input device. For example, if the icon on the GUI corresponds to a word processing application, clicking on the icon results in launching the word processing application. The pointer can also be used to rapidly scroll through pages of text within a word processing document for example.

The input device can be used to perform various tasks depending on the application being executed on the computer. In a map software program (generically referred to as location information program) for example, maps of a geographic area can be displayed. While displaying a map, the actuating button of the pointer can be depressed on a particular area of the map to zoom in on the selected area to provide additional detail while displaying a smaller overall geographic area. The actuating button therefore can be used to zoom in on an area of interest.

Referring to FIG. 1, a map of the United States 114 is illustrated. Center point 108 represents the center of bounding box 102 (which could also represent the user interface) that includes map 114. User interface 102 can represent a window corresponding to the map software program similar to a window that represents a work area of a document in a word processing program for example. The user can then request a more detailed view of a point of interest 105 on the map (such as New York City) by moving the pointer 104 to point of interest 105 and depressing the actuating button. The points of interest displayed on a graphical user interface may be thought of as objects.

The zooming in on the point of interest (i.e. New York in this example) results in map 314 of FIG. 3A being included within user interface 102. As illustrated, New York (point of interest 105) is now displayed in the center of user interface 102. Center point 108, still representing center of the user interface 102 (but no longer representing center of map 114), now coincides with point of interest 105. The point of interest 105 and center point 108 represent the same location on map 314.

Pointer 104, previously pointing to the point of interest 105 (in FIG. 1), however remains at the same physical location within the user interface 102 but no longer points to the point of interest 105 (in FIG. 3A). That is, the relative distance of pointer 104 with respect to the side and top of user interface 102 in FIG. 3A is identical to the relative distance of pointer 104 with respect to the side and top of user interface 102 in FIG. 1.

If a user now wishes to zoom in further on New York, the user has to move the mouse until pointer 104 points to the point of interest 105 (or, center point 108) prior to depressing the actuating button. The pointer location does not coincide with or, is not synchronized to, the point of interest when zooming occurs according to current implementations. If a user wishes to zoom in a few times (to a number of zooming levels), a cumulative delay factor is introduced into the process as the pointer has to be located and moved to the point of interest for each desired zooming level. The cumulative delay factor is a sum of delays each of which is associated with having to re-centering the pointer after each zooming function.

Some embodiments provide a synchronization (or, coordination) between the zooming function and the pointer location on a user interface.

SUMMARY

Methods according to the present invention address these needs and others by providing a method for maintaining the position of pointer on a center of a graphical user interface According to one exemplary embodiment of the present invention, a method for navigating a pointer on a graphical user interface (GUI) includes the steps of: scrolling an input device to locate the pointer corresponding to the input device on a point of interest within the GUI, depressing an actuating button associated with the input device on the point of interest, obtaining a detailed view of the point of interest while centering the point of interest on the GUI and maintaining a position of the pointer on the point of interest.

According to another exemplary embodiment of the present invention, a method of centering a pointer on a graphical user interface (GUI) includes navigating the pointer to a point of interest away from a center of the GUI, actuating a mechanism for obtaining a magnified view of the point of interest, computing a distance between a center of the GUI and a location of the point of interest, generating a detailed view of the point of interest, displaying the detailed view with the point of interest centered on the GUI and animating a movement of the pointer from the position away from the center of the GUI to the point of interest.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 3A:
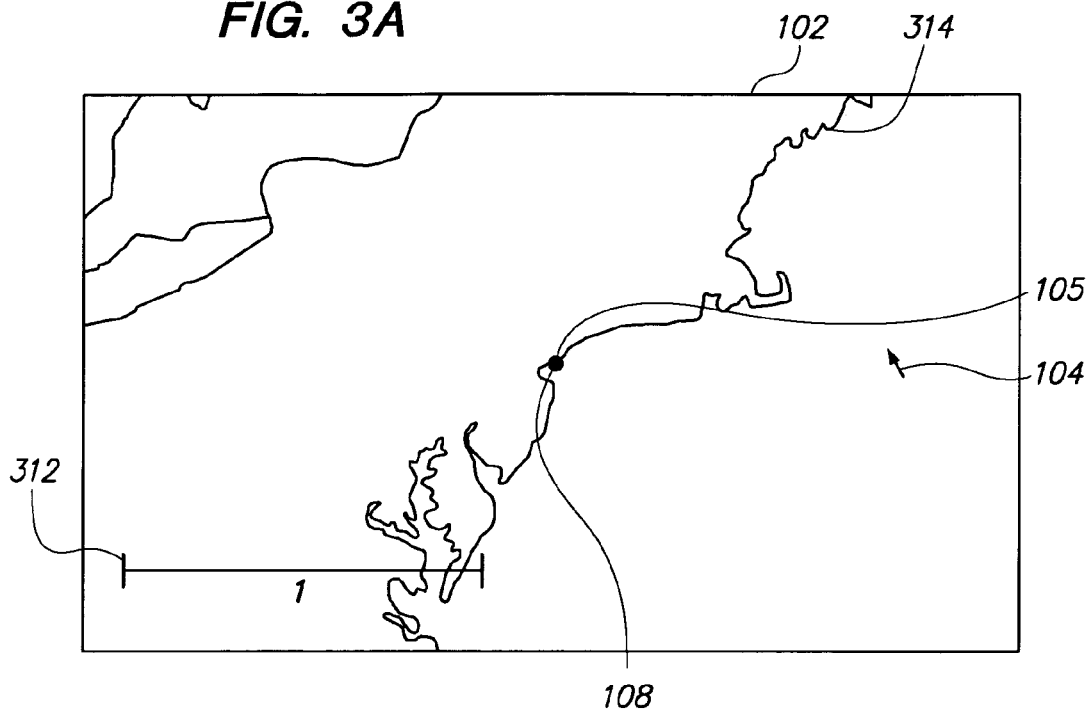
FIGS. 3A and 3B depicts a second magnified view of a portion of the user interfaces of FIGS. 1 and 2.
Figure 3B:
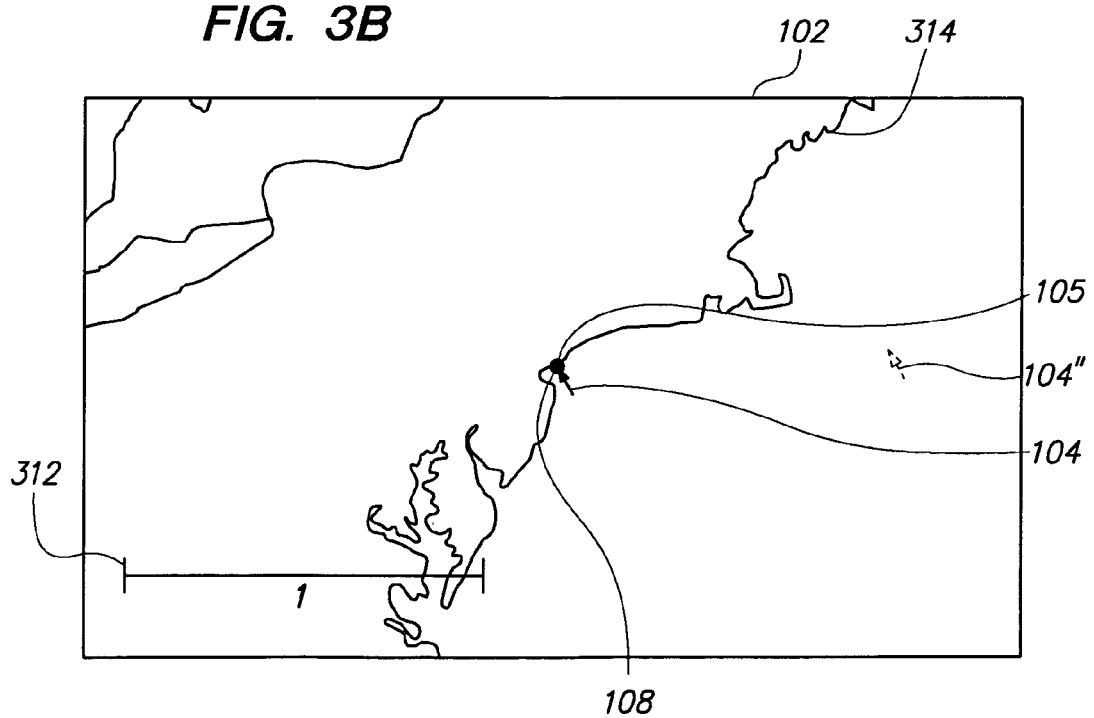

In exemplary embodiments, incremental zooming may be utilized to coordinate pointer location with a point of interest on a user interface. Referring back to FIG. 1, a user may navigate pointer 104 to a point of interest 105 and depresses the actuating button of an input device to obtain a more detailed view of point of interest 105. An incremental zooming may take place in a series of zooming levels from FIG. 1 to a desired zooming level for the point of interest 105 as illustrated in FIGS. 3A and 3B. The number of zooming levels may be two for example—that is, an intermediate zooming step may exist between user interface in FIG. 1 and that of FIGS. 3A and 3B. Having two zooming levels is specified for exemplary purposes; the number of zooming levels may be greater than two in preferred embodiments.

Figure 1:
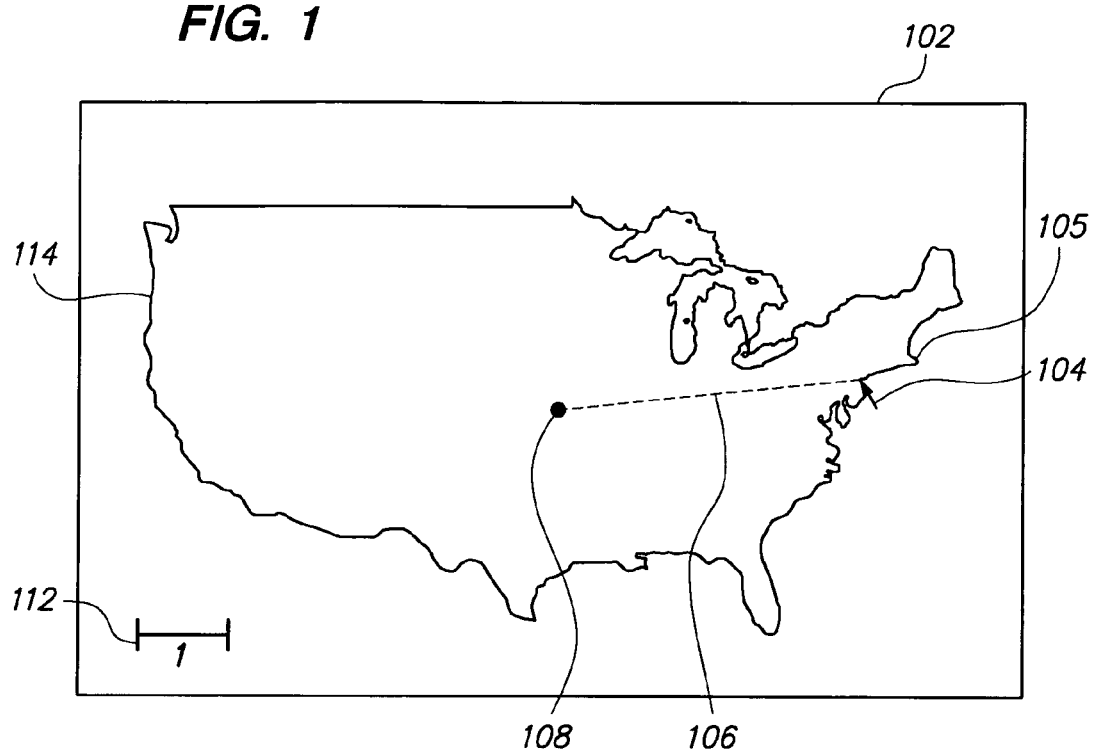
FIG. 1 depicts a graphical user interface corresponding to an exemplary location information program.

By navigating pointer 104 and depressing actuating button at the point of interest 105 on FIG. 1, a user may identify the location for which a detailed view is desired. The detailed view may be obtained from pre-stored information contained in the software program for example; it may also be generated. The program may be stored in the computer, in a computer medium (such as a compact disc) or accessible to the computer over a network such as the internet.

A distance 106 between center 108 and point of interest 105 may be computed. A virtual line (representing 106) may be drawn between starting point 108 and point of interest 105. The virtual line may represent the linear distance between points 108 and 105 of FIG. 1. An intermediate zooming level (or step) may be illustrated in FIG. 2. The center 108 of user interface 102 has now moved (along the virtual line representing distance 106) to approximately a midway point between center 108 in FIG. 1 and center 108 of FIG. 3A or 3B.

The center 108 of the user interface 102 remains fixed at one physical location on the interface as long as the size of the interface (represented by the window) remains constant; the geographic point represented by the center may vary based on the zooming level. For example, in FIG. 1, center 108 may represent some point in Nebraska while center 108 of FIG. 2 may represent some point in Ohio. The pointer, designated by 104, remains on the point of interest 105. The original location of pointer 104' (at point of interest 105 in FIG. 1) is also shown in FIG. 2 to distinguish exemplary embodiments over existing implementation methods.

A detailed view desired by zooming in point of interest 105 of FIG. 1 is illustrated in FIGS. 3A and 3B. A second zooming level may be illustrated with respect to FIGS. 3A and 3B. Starting from FIG. 2, the distance represented by line 206 (which is one half of the distance 106 of FIG. 1) between center 108 and point of interest 105 may be reduced to zero as center 108 of FIGS. 3A and 3B coincides with point of interest 105. As with FIG. 2 above, pointer 104 is now located over point of interest 105 in FIG. 3B. The location of pointer 104" (at point of interest 105 in FIG. 2) is also illustrated in FIG. 3B to distinguish exemplary embodiments over existing implementation methods.

Figure 2:
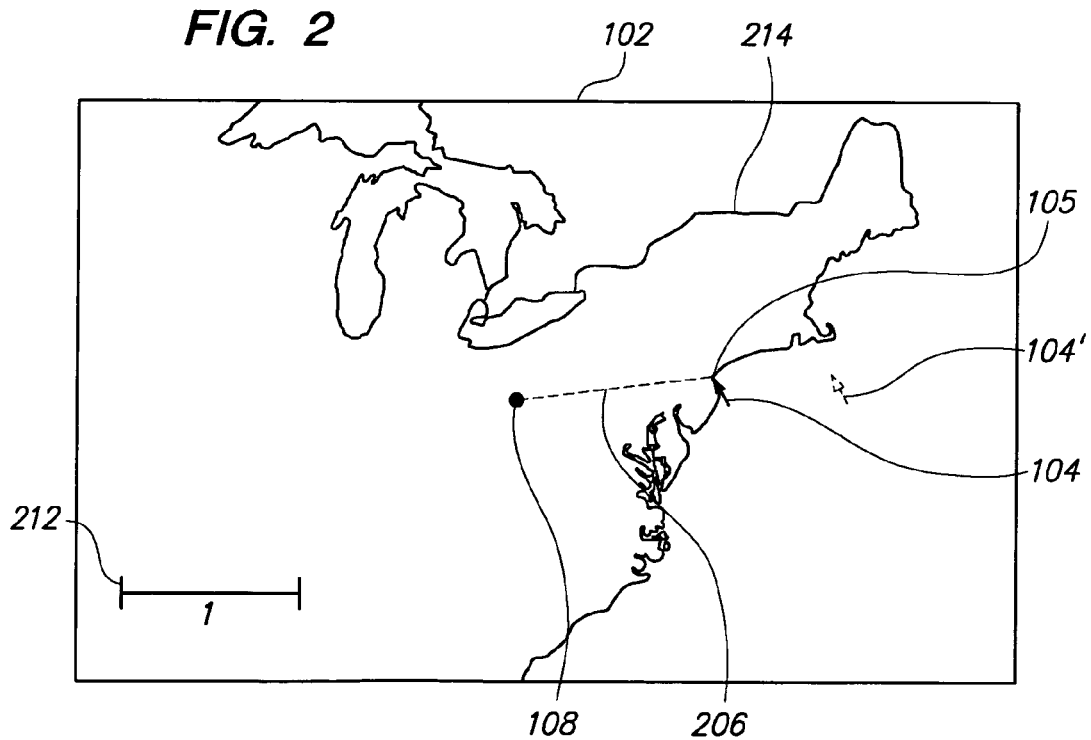
FIG. 2 illustrates a first magnified view of a portion of the user interface of FIG. 1 in exemplary embodiment.

In some embodiments, the intermediate zooming level, the results of which are illustrated in FIG. 2, may not be needed. That is, the zooming can transition from FIG. 1 to FIG. 3B. Pointer 104 would be positioned over point of interest 105 after the transition. Other embodiments may include additional zooming levels (additional to the two levels illustrated).

Centering the point of interest 105 within user interface 102 while zooming in may be achieved by combining the zooming function with a simultaneous panning function. Panning refers to translating the view in either the vertical horizontal dimensions. As a result of the panning process, the point of interest 105 coincides with center 108 of the interface 102.

As the actuation button of the input device is depressed to achieve zooming, the point of interest 105 may move along the dotted distance line 106 to center 108 of the interface 102. A progress of the pointer's movement along this line may be illustrated in an animated manner. In preferred embodiments, panning in order to make the point of interest 105 coincide with center 108 of user interface 102 may be completed at the same time the desired zooming level is achieved. The amount of movement (or displacement) the point of interest 105 undergoes for each zooming step may be computed. As described above, center 108 of the interface represents the point of interest as a result of this movement.

The final level of detail available for zooming in may be determined by a designer of the particular software program being used. For example, a designer of a map software program might choose to facilitate zooming in to a block level or a street level, etc. This may assist in determining the number of available zooming levels between a starting point 108 of FIG. 1 and ending point 108 of FIGS. 3A and 3B for example. The number of available zooming levels may also determine how long it takes to get from the starting point to the ending point.

While the number of zooming levels illustrated is two and one intermediate frame is illustrated in this example, a higher number of zooming levels will result in more intermediate frames being shown. If four levels are available in an embodiment, then the number of intermediate frames may be three. That is, a first intermediate frame may depict point 108 being located between point 108 of FIG. 1 and point 108 of FIG. 2; a second intermediate frame may be identical to FIG. 2; a third intermediate frame may depict point 108 being located between point 108 of FIG. 2 and point 108 of FIG. 3A (or 3B) and a fourth frame may be identical to FIG. 3A (of 3B). If the number of available zoom levels is N, then the number of intermediate frames may be N−1.

Exemplary methods may also facilitate zooming out from a point of interest. In zooming out, the pointer may remain on the point of interest but the center may no longer coincide with the pointer. In FIG. 3B for example, if zooming out is indicated via the user input device, a portion of the user interface may illustrate the Atlantic Ocean east of New York for which no data may be available. In this case, the center 108 may be moved westward while pointer 104 remains on point of interest 105.

Each of the figures also shows a scale (designated by 112, 212 and 312) to depict what one unit may represent (such as distance for example) in the corresponding figure. In some embodiments, a history of zooming levels that were illustrated (frames) may be maintained in order to enable a user to visit previous frames.

In some embodiments as described above, the animation or transition between a starting point (such as FIG. 1) and the ending point (FIGS. 3A and 3B) may occur in a linear manner. That is, if only one intermediate frame is shown, the intermediate frame may be the midway point between the starting and ending points; similarly, if three intermediate frames are shown, they may represent points that are one quarter of the way, one half of the way and three quarters of the way between the starting point and the ending point as the intermediate frames.

In other embodiments, the animation may take place at a different rate (or at a varying rate). The first few intermediate frames may be shown slowly, the next several intermediate frames may be shown at a faster rate and the last few intermediate frames may be shown slowly for example.

Exemplary embodiments may be implemented on a general purpose computer such as a desktop, a laptop, a pocket PC, personal digital assistant (PDA) or other similar devices having the processing capacity. Methods described may be encoded on a computer readable medium as a series of executable instructions or on an application specific integrated chip (ASIC).

Figure 4:
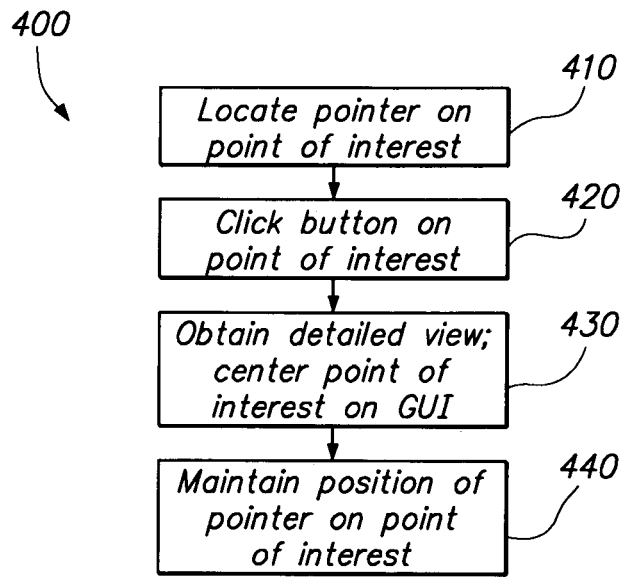
FIGS. 4 and 5 illustrate methods in accordance with exemplary embodiments.
Figure 5:
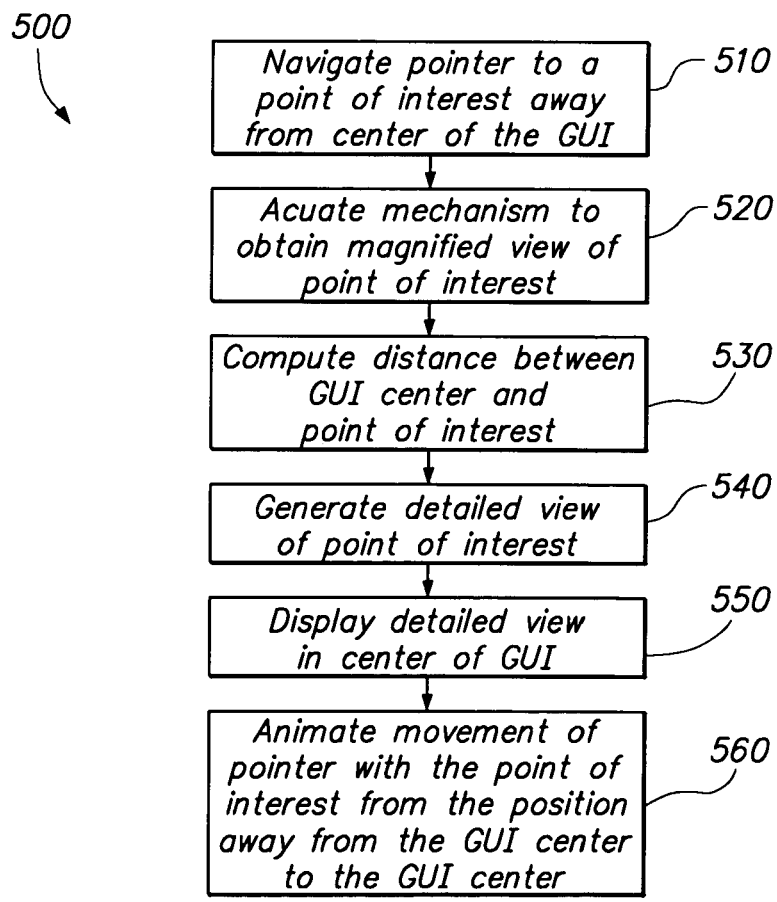

Methods in accordance with exemplary embodiments as described above may be illustrated as process or flow charts 400 and 500 in FIGS. 4 and 5 respectively.

While the description has focused on zooming in on a map, exemplary methods may be equally applicable in other scenarios such as in virtual tour programs (i.e. real estate viewing for example) and in gaming, etc. The methods can also be used in menu selection within an entertainment/pay-per-view environment. For example, thumb nail images representing various movies available for viewing or on a pay-per-view basis may be displayed to a user on a display or screen. The user may utilize a 3D pointing device such as that developed by Hillcrest Laboratories of Rockville, MD to select one of the images. As a result of this selection, more detailed information corresponding to the selected image may be displayed to the user. Input devices may also include a graphic tablet, a tracking surface such as a track pad or a 3D pointing device.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method of navigating a pointer on a graphical user interface (GUI), said method comprising the steps of:
   scrolling an input device to locate the pointer corresponding to the input device on a point of interest within the GUI;
   said point of interest being away from a center of the GUI;
   depressing an actuating button associated with said input device on the point of interest;
   obtaining a detailed view of the point of interest while centering the point of interest on said GUI; and
   maintaining a position of the pointer on the point of interest.

2. The method of claim 1, wherein the input device is one of graphic tablet, a tracking surface and a 3D pointing device.

3. The method of claim 1, wherein the detailed view of the point of interest is obtained while zooming in on the point of interest and simultaneously panning over the GUI.

4. The method of claim 1, wherein the detailed view is obtained in a series of intermediate zooming levels.

5. The method of claim 4, wherein the pointer position is maintained over the point of interest at each zooming level.

6. The method of claim 4, wherein the number of zooming levels is at least two.

7. The method of claim 1 further comprising:
   computing a linear distance between the center of the GUI and the point of interest;
   drawing a virtual line representing the linear distance;
   animating a movement of the pointer along the virtual line in a series of intermediate zooming levels.

8. The method of claim 1, wherein the graphical user interface corresponds to a location information program.

9. The method of claim 1, wherein the graphical user interface corresponds to a menu selection in a pay per view environment.

10. The method of claim 1 further comprising storing information for each intermediate zooming level as a history.

11. A method of navigating a pointer on a graphical user interface (GUI), said method comprising the steps of:
    navigating the pointer to a point of interest away from a center of the GUI;
    actuating a mechanism for obtaining a magnified view of the point of interest;
    computing a distance between the center of the GUI and a location of the point of interest;
    generating a detailed view of the point of interest;
    displaying the detailed view in the center of the GUI; and
    animating a movement of the pointer with the point of interest from the position away from the center of the GUI to the center of the GUI.

12. The method of claim 11, wherein the animation takes place concurrently with the generation and display of the detailed view.

13. The method of claim 11, wherein the computed distance is represented on the GUI by a path.

14. The method of claim 13, wherein the animation of the pointer movement occurs along said path.

15. The method of claim 11, wherein the graphical user interface is a window representing a working area of a software application program executing on a computer.

16. The method of claim 11, wherein the transition to the detailed view occurs over a plurality of intermediate zooming levels.

17. The method of claim 16, wherein the pointer is located on the point of interest at each zooming level.

18. The method of claim 17, wherein the transition occurs in a linear manner with each intermediate level representing a next zooming level.

19. The method of claim 18, wherein the transition occurs in a combination of linear and non-linear levels.

20. A computer readable medium containing executable instructions, when executed in a processing system, cause the system to perform a method comprising:
    navigating the pointer to a point of interest away from a center of the GUI;
    actuating a mechanism for obtaining a magnified view of the point of interest;
    computing a distance between the center of the GUI and a location of the point of interest;
    generating a detailed view of the point of interest;
    displaying the detailed view in the center of the GUI; and
    animating a movement of the pointer from the position away from the center of the GUI to the center.

* * * * *